D. MENDENHALL.
Tree-Protector.
No. 70,349.
Patented Oct 29, 1867
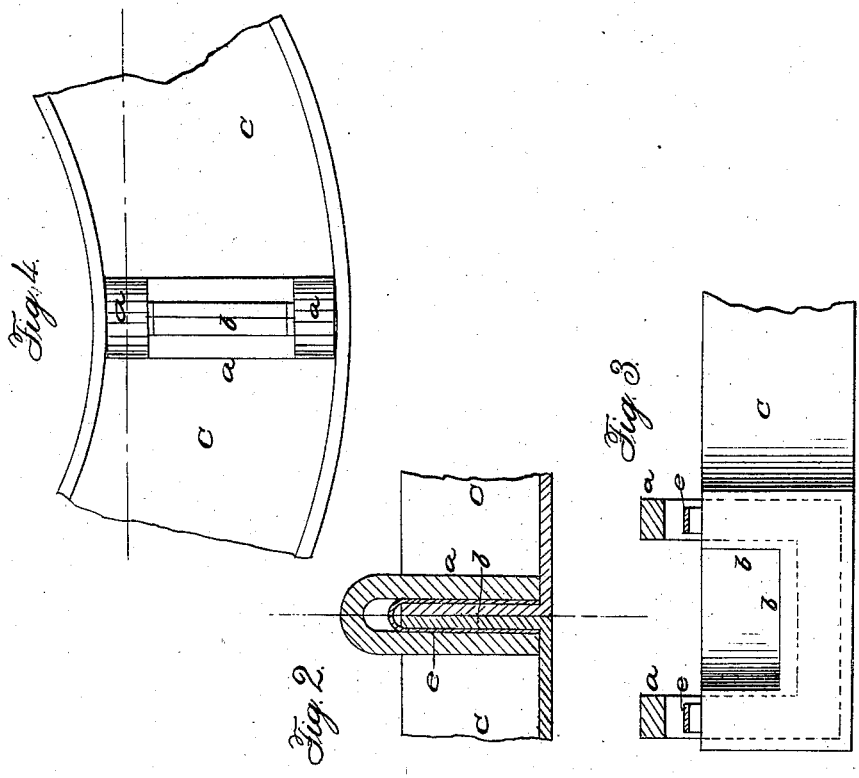
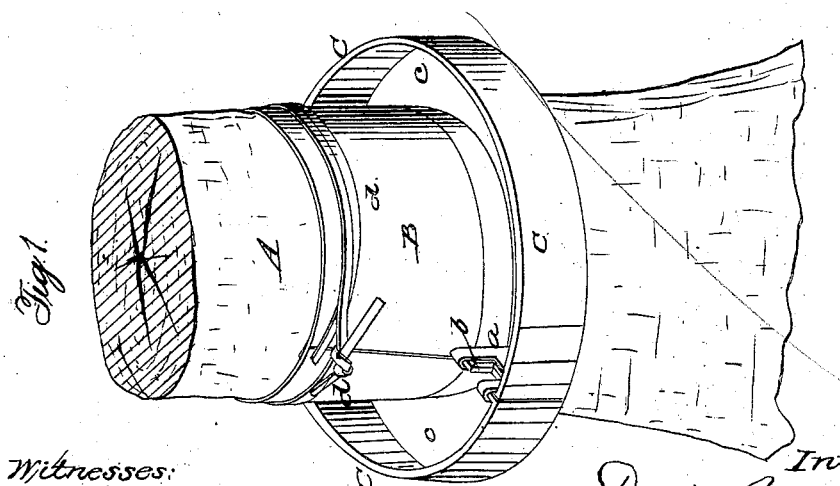

United States Patent Office.

DANIEL MENDENHALL, OF FAIRFIELD, IOWA.

*Letters Patent No. 70,349, dated October 29, 1867.*

TREE-PROTECTOR.

*The Schedule referred to in these Letters Patent and making part of the same.*

TO ALL WHOM IT MAY CONCERN:

Be it known that I, DANIEL MENDENHALL, of Fairfield, in the county of Jefferson, and State of Iowa, have invented a new and useful Improvement in Tree-Protectors; and I do hereby declare that the following is a full, clear, and exact description thereof, reference being had to the accompanying drawings, making a part of this specification, in which—

Figure 1 is a perspective view of a portion of the trunk of a tree, showing my invention applied to it.

Figure 2 is a sectional view of the clasp for uniting the ends of the protecting trough.

Figures 3 and 4 also show the clasp, and the mode of applying it to the ends of the trough.

Similar letters of reference indicate corresponding parts in the several figures.

This invention relates to certain novel improvements on the device for protecting trees, shrubbery, and other plants from the ravages of worms, for which Letters Patent of the United States were granted to me, bearing date on the 16th day of October, 1866.

The nature of my invention consists in providing for attaching a trough, of a flexible or other suitable material, around the trunk of a fruit or other tree, by means of a flexible collar or band which extends up from the inner flange or side of the trough, and encompasses the trunk of the tree, so that when properly bound and fastened with a cord, the ascent of worms above the trough will be effectually prevented, as will be hereinafter described.

The invention further consists in providing for the use of clasps for uniting the ends of the trough around the trunks of trees, and confining the troughs securely in place, so that they will contain water or other liquid for preventing the ascent of worms, bugs, or other insects, as will be hereinafter described.

To enable others skilled in the art to understand my invention, I will describe its construction and operation.

In the accompanying drawings, C represents a trough, which may be made of India rubber or other suitable substance, with internal and external flanges or rims united to a bottom, so as to form a chamber, $c$, extending entirely around the trunk A of the tree, for containing water or other liquid. The clasp $a$ which unites the ends of the circular trough is a piece of metal bent in the form of the letter U, with a portion cut out of its bent edge, so as to leave a space, $b$, for allowing of a communication of the water or other liquid put into the trough, and thereby preventing worms, bugs, and other insects from crossing over at said point of connection. In order to apply this clasp $a$ properly, lips are formed on the trough, as shown in figs. 2 and 3, which are embraced by said clasp, thus making a water-tight joint at the junction of the ends of the trough. If the trough is made of India rubber, the said lips will be so tightly compressed as to form a very close joint. To prevent injury to the ends of the trough by the corrosion of the metal clasps, I introduce brass or other pieces of metal which are not readily corroded between the lips of the trough and the clasp, as shown in figs. 2 and 3 at $e$. To the flange which is of least diameter, or that which comes nearest the tree, a collar, B, of India rubber or other flexible material, is applied in any suitable manner, so as to extend some two or more inches above the trough, and to pass entirely around the tree and overlap, as shown in fig. 1 of the drawings. This collar or band is secured tightly in place by means of cords $d$ or wires or other suitable means. This collar B is made so as to fit snugly in contact with the tree, and prevent the ascent of vermin between it and the tree.

Where a flexible collar, B, is employed, as described, it will not be necessary to have the trough C to fit the tree very tight, and hence the trough may be made of metal or other inelastic and inflexible substance, with the yielding flexible collar applied to it as described. I prefer, in all cases, to employ India rubber as the best substance of which to make the troughs, as it is more durable than metal, and will adapt itself to all the inequalities and irregularities of surface to which it is applied, and thus close all channels through which the vermin might effect a passage.

Having described my invention, what I claim as new, and desire to secure by Letters Patent, is—

1. The flexible collar or band B applied to a trough, C, and adapted to serve the purposes described.

2. The use of a clasp, $a$, for uniting the extremities of the trough C about a tree, substantially as described.

3. The combination of the interposed protecting strip $e$ and clasp $a$ with a trough, C, substantially as described.

DANIEL MENDENHALL.

Witnesses:
EDW. W. SCHAFER,
JNO. KINGDON.